(12) United States Patent
Tseng et al.

(10) Patent No.: US 10,972,826 B1
(45) Date of Patent: Apr. 6, 2021

(54) HEAD MOUNTED DISPLAY AND DRIVING METHOD THEREOF

(71) Applicant: HTC Corporation, Taoyuan (TW)

(72) Inventors: Yung-Ching Tseng, Taoyuan (TW); Yen-Chieh Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/660,760

(22) Filed: Oct. 22, 2019

(51) Int. Cl.
*H04R 1/10* (2006.01)
*G08B 6/00* (2006.01)

(52) U.S. Cl.
CPC ............ *H04R 1/1041* (2013.01); *G08B 6/00* (2013.01); *H04R 1/105* (2013.01); *H04R 1/1008* (2013.01); *H04R 1/1075* (2013.01); *H04R 2499/15* (2013.01)

(58) Field of Classification Search
CPC ........ H04R 1/1041; H04R 17/00; G06F 3/016
USPC ....................... 381/74, 162, 62, 64
See application file for complete search history.

(56) References Cited

U.S. PATENT DOCUMENTS

| | | | |
|---|---|---|---|
| 10,194,259 B1* | 1/2019 | Martin | G06F 3/167 |
| 2013/0038458 A1* | 2/2013 | Toivola | H04R 1/1091 |
| | | | 340/665 |
| 2015/0335288 A1* | 11/2015 | Toth | A61B 5/6833 |
| | | | 600/373 |
| 2017/0135896 A1* | 5/2017 | Snow | G05G 9/047 |
| 2017/0295269 A1* | 10/2017 | Hosoi | H04R 1/10 |
| 2019/0272034 A1* | 9/2019 | Pan | G06F 3/0346 |

* cited by examiner

*Primary Examiner* — Alexander Krzystan
(74) *Attorney, Agent, or Firm* — JCIPRNET

(57) ABSTRACT

A head mounted display including a main body, a sound controller, a vibration driver, a motion sensor, a vibrator and a speaker is provided. The main body has a display device. The sound controller is electrically connected to the main body. The vibration driver is electrically connected to the sound controller. The motion sensor is configured to sense a motion state of the main body. The vibrator is electrically connected to the vibration driver. The vibration driver receives a vibration signal from the sound controller, adjusts the vibration signal as needed according to the motion state and then drives the vibrator to generate vibration by the vibration signal. The speaker is electrically connected to the sound controller. The speaker outputs a sound according to a sound signal received from the sound controller. A driving method of a head mounted display is also provided.

20 Claims, 14 Drawing Sheets

HEAD MOUNTED DISPLAY AND DRIVING METHOD THEREOF

FIELD OF THE INVENTION

The application relates to an electronic apparatus and a driving method thereof and more particularly, to a head mounted display and a driving method thereof.

DESCRIPTION OF RELATED ART

In recent years, head mounted displays (HMDs), for example, augmented reality (AR) display devices, mixed reality (MR) display devices or virtual reality (VR) display devices have gradually become popular products on the market.

SUMMARY

The application provides a head mounted display and a driving method thereof with vibration feedbacks that can provide users with good experience.

The application provides a head mounted display and a driving method thereof capable of mitigating discomfort caused by vibrations of haptic feedbacks and distorted sounds generated due to the vibrations, such that users may have more comfortable use experience by using the method as set forth in the application.

A head mounted display of an embodiment of the application includes a main body, a sound controller, a vibration driver, a motion sensor, a vibrator and a speaker. The main body has a display device. The sound controller is electrically connected to the main body. The vibration driver is electrically connected to the sound controller. The motion sensor is configured to sense a motion state of the main body. The vibrator is electrically connected to the vibration driver. The vibration driver receives a vibration signal from the sound controller, adjusts the vibration signal as needed according to the motion state and then drives the vibrator to generate vibration by the vibration signal. The speaker is electrically connected to the sound controller. The speaker outputs a sound according to a sound signal received from the sound controller.

In an embodiment of the application, the head mounted display further includes a housing, wherein the main body, the sound controller, the vibration driver, the vibrator and the speaker are assembled to the housing.

In an embodiment of the application, the head mounted display further includes a sound driver. The sound driver is assembled to the housing, wherein the speaker is electrically connected to the sound controller via the sound driver.

In an embodiment of the application, the head mounted display further includes a housing, wherein the sound controller, the vibration driver, the vibrator and the speaker are assembled to the housing. The main body is separated from the housing.

In an embodiment of the application, the head mounted display further includes a sound driver. The sound driver is assembled to the housing, wherein the speaker is electrically connected to the sound controller via the sound driver.

In an embodiment of the application, the head mounted display further includes a sound driver, a first housing and a second housing, wherein the main body, the sound controller, the sound driver and the speaker are assembled to the first housing. The vibration driver and the vibrator are assembled to the second housing. The speaker is electrically connected to the sound controller via the sound driver. The first housing is separated from the second housing.

In an embodiment of the application, the head mounted display further includes a strap. The vibrator and the speaker are disposed on the strap.

In an embodiment of the application, the head mounted display further includes a strain gauge. The strain gauge is electrically connected to the vibration driver and configured to measure a head circumference size of a user of the head mounted display. The vibration driver adjusts the vibration signal according to a measurement result of the strain gauge to drive the vibrator to generate the vibration.

In an embodiment of the application, the head mounted display further includes a cushion pad, wherein the vibrator is disposed at a location corresponding to a location above an ear on the user's head, and the cushion pad is disposed between the user's head and the vibrator.

In an embodiment of the application, the motion sensor is an accelerometer configured to measure an acceleration value of the main body.

In an embodiment of the application, the main body further has a circuit board. The motion sensor is disposed on the circuit board and separated from the display device.

A driving method of a head mounted display of an embodiment of the application includes: by a sound controller of the head mounted display, providing a vibration signal and a sound signal; by a vibration driver of the head mounted display, receiving the vibration signal from the sound controller, adjusting the vibration signal as needed according to a motion state of the main body sensed by a motion sensor of the head mounted display and then driving the vibrator to generate vibration by the vibration signal; and by a speaker of the head mounted display, outputting a sound according to the sound signal received from the sound controller.

In an embodiment of the application, the step of adjusting the vibration signal as needed includes: after the vibrator generates the vibration, determining whether a first acceleration value of a display device of the head mounted display is lower than a threshold. If no, the vibration signal is adjusted to reduce the first acceleration value.

In an embodiment of the application, the step of determining the first acceleration value and adjusting the vibration signal includes: determining whether a component of the first acceleration value in a first direction is lower than a first threshold. If no, a gain value and a phase of the vibration signal are adjusted to reduce the component of the first acceleration value in the first direction. Whether a component of the first acceleration value in a second direction perpendicular to the first direction is lower than a second threshold is determined. If no, the gain value and the phase of the vibration signal are adjusted to reduce the component of the first acceleration value in the second direction. Whether a component of the first acceleration value in a third direction perpendicular to the first direction and perpendicular to the second direction is lower than a third threshold is determined. If no, the gain value and the phase of the vibration signal are adjusted to reduce the component of the first acceleration value in the third direction.

In an embodiment of the application, the step of determining whether the first acceleration value is lower than the threshold includes: by the motion sensor disposed on a circuit board of a main body of the head mounted display, obtaining a second acceleration value. The second acceleration value is transferred through a transfer function to obtain the first acceleration value.

In an embodiment of the application, a method of establishing the transfer function includes: disposing an accelerometer on the main body. A vibration testing signal is provided to the head mounted display to induce the vibrator to generate the vibration. A relation among measurement results of the accelerometer is analyzed to establish the transfer function with respect to vibrations of the head mounted display and the display device.

In an embodiment of the application, the step of adjusting the vibration signal as needed is: determining whether a similarity of the vibration signals that are continuously received by the vibration driver is higher than a threshold. If yes, the gain value of the vibration signal that is subsequently output is reduced.

In an embodiment of the application, the step of reducing the gain value of the vibration signal that is subsequently output includes: determining whether patterns of the vibration signals that are continuously received by the vibration driver are the same and whether levels of the vibration signals are the same or increased. If both are yes, the gain value of the vibration signal that is subsequently output is reduced.

In an embodiment of the application, the step of adjusting the vibration signal as needed is: determining whether a duration that an average level of the vibration signals in a wave band less than or equal to 200 Hz is greater than a threshold level exceeds a threshold duration. If yes, the gain value of the vibration signal that is subsequently output is reduced.

In an embodiment of the application, the step of adjusting the vibration signal as needed uses a default equalization curve to reduce the gain value of the vibration signal that is subsequently output. A method of establishing the default equalization curve includes: inducing the vibration driver to drive the vibrator to generate the vibration according to a chirp or a step sweep function. An average of root mean square values of components of an acceleration value in the first direction, the second direction and the third direction perpendicular to one another in a motion state which are sensed by the motion sensor is calculated to obtain an acceleration frequency response curve. The acceleration frequency response curve is reversed and then is superimposed with a low-frequency compensation curve to establish the default equalization curve.

In an embodiment of the application, the step of adjusting the vibration signal as needed includes: determining whether the head mounted display has established the default equalization curve. If yes, the gain value of the vibration signal that is subsequently output is reduced according to the default equalization curve.

In an embodiment of the application, the step of adjusting the vibration signal as needed uses one of a plurality of default equalization curves to reduce the gain value of the vibration signal that is subsequently output, and the default equalization curves respectively correspond to different head circumference sizes.

In an embodiment of the application, the driving method further includes measuring a head circumference size of a user wearing the head mounted display by using a strain gauge of the head mounted display to determine which one of the default equalization curves is used to reduce the gain value of the vibration signal that is subsequently output.

Based on the above, in the head mounted display and the driving method thereof provided by one of the embodiments of the application, the vibration driver receives the vibration signal from the sound controller, adjusts the vibration signal as needed according to the motion state and then drives the vibrator to generate the vibration by the vibration signal. The vibration driver can allow the user to have not only audio-visual effects but also haptic feedbacks to obtain good experience.

To make the above features and advantages of the application more comprehensible, embodiments accompanied with drawings are described in detail below.

DESCRIPTION OF EMBODIMENTS

Figure 1A:
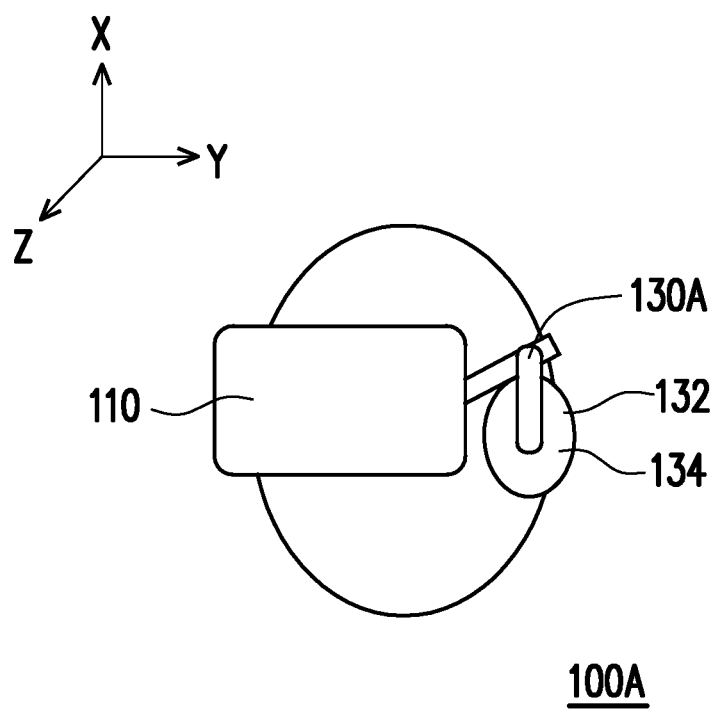
FIG. 1A is a schematic diagram of a head mounted display according to an embodiment of the application.
Figure 1B:
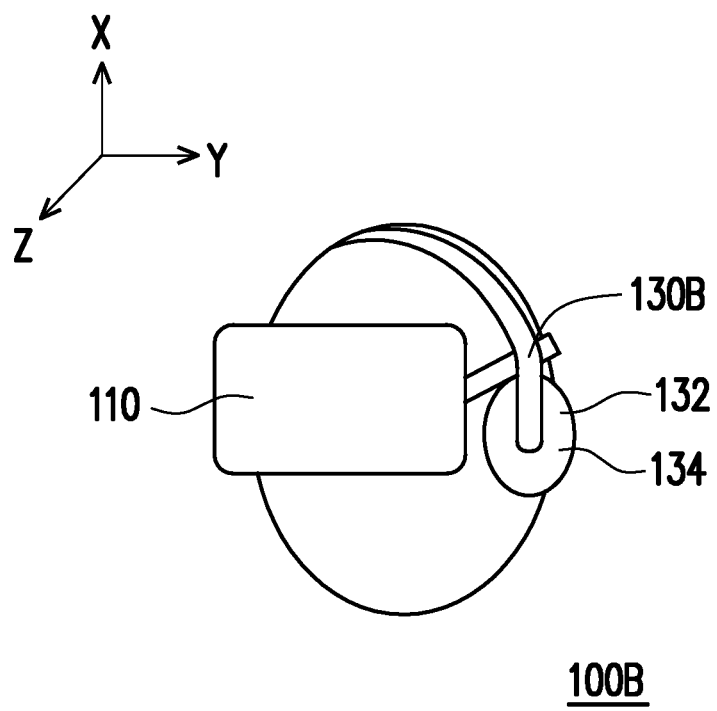
FIG. 1B is a schematic diagram of a head mounted display according to another embodiment of the application.
Figure 1C:
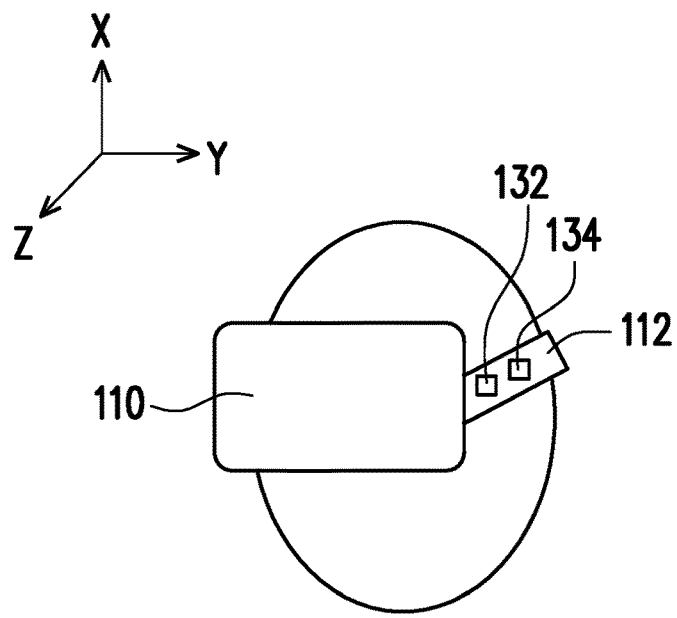
FIG. 1C is a schematic diagram of a head mounted display according to another embodiment of the application.

FIG. 1A is a schematic diagram of a head mounted display 100A according to an embodiment of the application. FIG. 1B is a schematic diagram of a head mounted display 100B according to another embodiment of the application. FIG. 1C is a schematic diagram of a head mounted display 100C according to another embodiment of the application. FIG. 1A to FIG. 1C simply schematically illustrate the head mounted displays 100A to 100C of the embodiments of the application.

Referring to FIG. 1A first, the head mounted display 100A includes a main body 110 and a headphone 130A. The headphone 130A includes a speaker 132 and a vibrator 134, wherein the main body 110 and the headphone 130A are connected with each other.

Referring to FIG. 1B, the main difference between the head mounted display 100B and the head mounted display 100A illustrated in FIG. 1 is as below. The main body 110 and a headphone 130B of the head mounted display 100B are separated from each other. Signals may be transmitted between the main body 110 and the headphone 130B in a wired or a wireless manner, and the transmitted signals may be digital signals or analog signals.

Referring to FIG. 1C, the main difference between the head mounted display 100C and the head mounted display 100A illustrated in FIG. 1 is as below. The head mounted display 100C further includes a strap 112, wherein the speaker 132 and the vibrator 134 are disposed on the strap 112. Namely, the main body 110, the speaker 132 and the vibrator 134 are integrally designed.

In FIG. 1A to FIG. 1C, each of the head mounted displays 100A to 100C including a speaker 132 and a vibrator 134 is taken as an example, but the application is not limited thereto. Each of the head mounted displays 100A to 100C may include a plurality of speakers 132 and a plurality of vibrators 134. For example, each of the head mounted displays 100A to 100C may include two speakers 132 and two vibrators 134 respectively corresponding to the left and the right ears.

Figure 2:
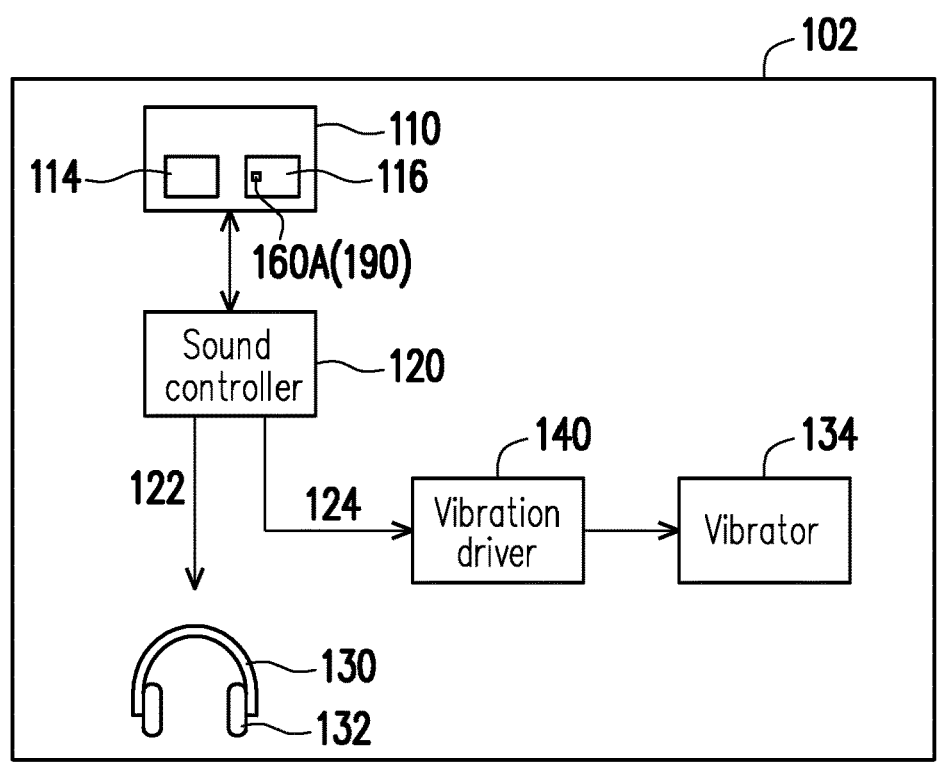
FIG. 2 is a schematic block diagram of a head mounted display according to an embodiment of the application.

FIG. 2 is a schematic block diagram of a head mounted display 100D according to an embodiment of the application. Referring to FIG. 2, in detail, the head mounted display 100D includes a main body 110, a sound controller 120, a vibration driver 140, a motion sensor 190, a vibrator 134 and a speaker 132. The speaker 132 is, for example, a headphone 130. The main body 110 has a display device 114. The sound controller 120 is electrically connected to the main body 110. The vibration driver 140 is electrically connected to the sound controller 120. The motion sensor 190 is configured to sense a motion state of the main body 110. The motion sensor 190 may be a so-called three-axial, six-axial or nine-axial sensor and actually may be a combination of three types of sensors, including a three-axial acceleration sensor, a three-axial gyro and a three-axial electronic compass (i.e., a geomagnetic sensor). The three parts have different functions operated cooperatively with one another and are motion sensing and tracking elements commonly used in virtual reality VR, AR, MR and other electronic products and applied for mutual control in various kinds of software and games. In a virtual reality scenario, because locations of some virtual objects in the scenario after a head motion have to be simulated, a location of the head with respect to the world has to be obtained at real time. Thereby, the motion sensor 190 (e.g., a nine-axial sensor) is capable of perceiving a helmet posture. A head location includes six parameters, wherein three of them represent rotation, the other three represent locations, and there are six degrees of freedom in total, such that information is output to the virtual reality scenario to create a head posture just like in a real world. The motion sensor 190 may be disposed at different locations on the head mounted display 100D. The motion sensor 190 may sense not only the user's motion or rotation, but also vibration caused by the vibrator 134 or the speaker 132 of the head mounted display 100D. The motion sensor 190 generates different movement signals according to different frequencies, intensities, amplitudes or phases that are sensed. The vibrator 134 is electrically connected to the vibration driver 140. The vibration driver 140 receives a vibration signal 124 from the sound controller 120, adjusts the vibration signal 124 as needed according to a movement signal and then drives the vibrator 134 to generate vibration by the vibration signal 124. The movement signal for adjusting the vibration signal 124 as needed may be a high-frequency movement signal or a low-amplitude movement signal. The vibration signal 124 capable of being adjusted includes a vibration strength, a gain value, a frequency, an amplitude, a pulse width modulation or a vibration phase. The speaker 132 is electrically connected to the sound controller 120. The speaker 132 outputs a sound according to a sound signal 122 received from the sound controller 120.

In the present embodiment, the head mounted display 100D further includes a housing 102, wherein the main body 110, the sound controller 120, the vibration driver 140, the vibrator 134 and the speaker 132 are assembled to the housing 110. In the head mounted display 100D of the present embodiment, the vibration driver 140 receives the vibration signal 124 from the sound controller 120, the vibration signal 124 is adjusted as needed according to a motion state and then, drives the vibrator 134 to generate vibration by the vibration signal 124, which allows the user to have not only audio-visual effects but also haptic feedbacks to obtain good experience.

Figure 3:
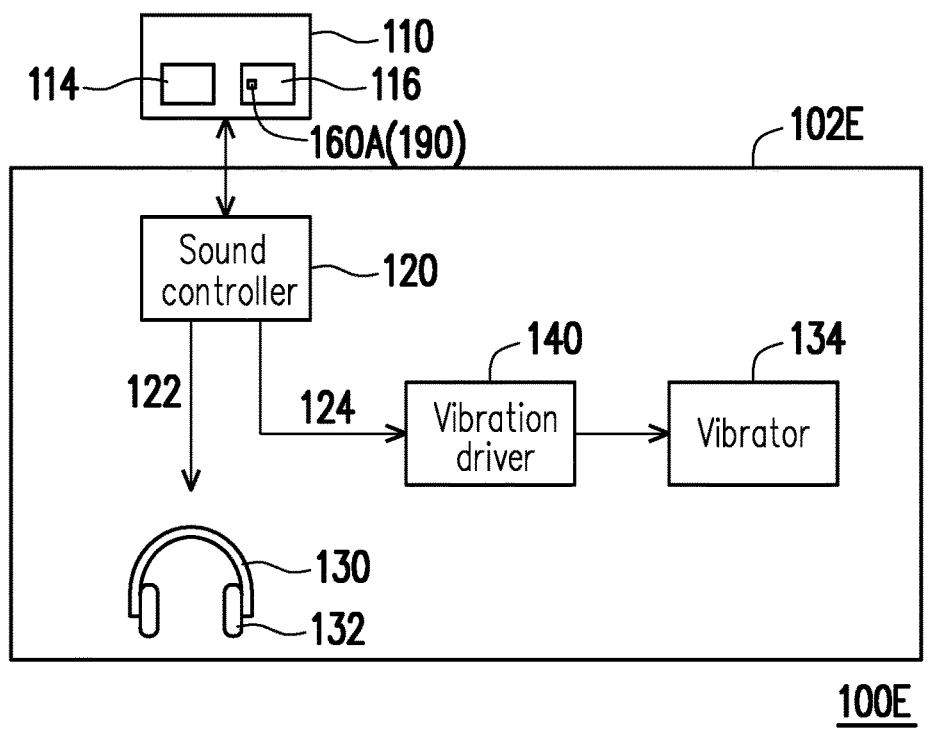
FIG. 3 is a schematic block diagram of a head mounted display according to another embodiment of the application.

FIG. 3 is a schematic block diagram of a head mounted display 100E according to another embodiment of the application. Referring to FIG. 3, the main difference between the head mounted display 100E and the head mounted display 100D illustrated in FIG. 2 is as below. The head mounted display 100E further includes a housing 102E, wherein the sound controller 120, the vibration driver 140, the vibrator 134 and the speaker 132 are assembled to the housing 102E. The main body 110 is separated from the housing 102E.

Figure 4:
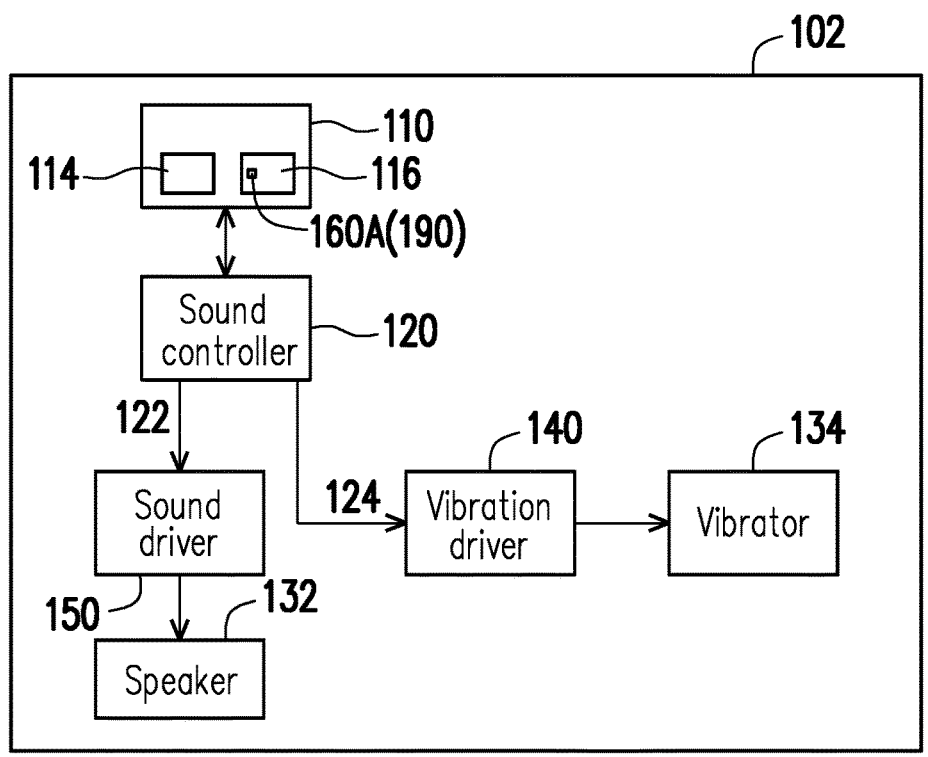
FIG. 4 is a schematic block diagram of a head mounted display according to another embodiment of the application.

FIG. 4 is a schematic block diagram of a head mounted display 100F according to another embodiment of the application. Referring to FIG. 4, the main difference between the head mounted display 100F and the head mounted display 100D illustrated in FIG. 2 is as below. The head mounted display 100F further includes a sound driver 150. The sound driver 150 is assembled to the housing 102, wherein the speaker 132 is electrically connected to the sound controller 120 via the sound driver 150.

Figure 5:
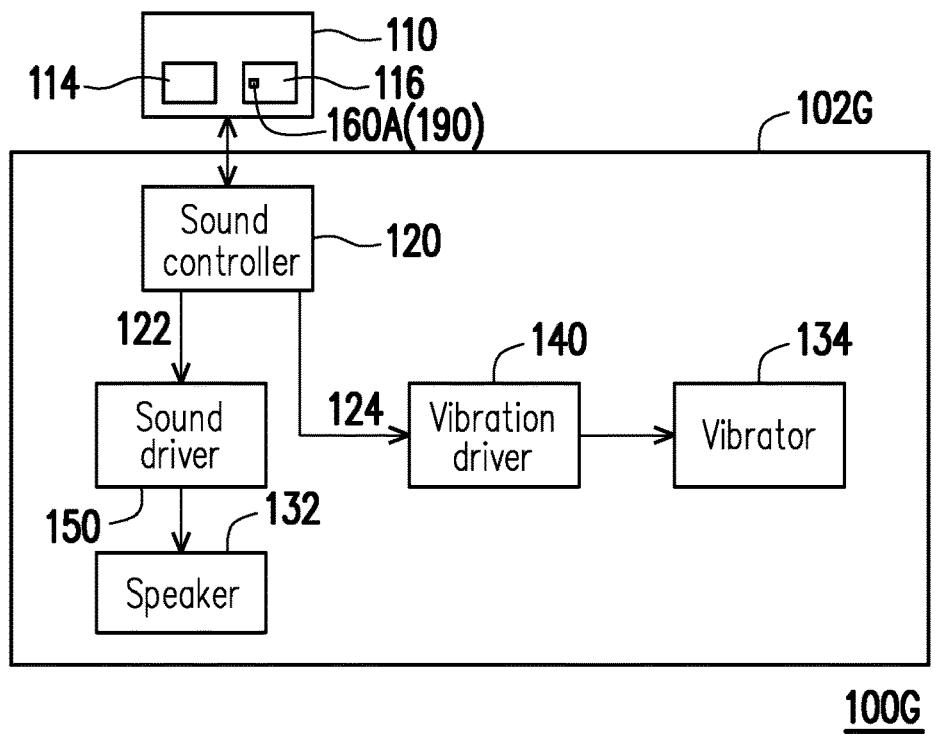
FIG. 5 is a schematic block diagram of a head mounted display according to another embodiment of the application.

FIG. 5 is a schematic block diagram of a head mounted display 100G according to another embodiment of the application. Referring to FIG. 5, the main difference between the head mounted display 100G and the head mounted display 100E illustrated in FIG. 3 is as below. The head mounted display 100G further includes a sound driver 150. The sound driver 150 is assembled to a housing 102G wherein the speaker 132 is electrically connected to the sound controller 120 via the sound driver 150.

Figure 6:
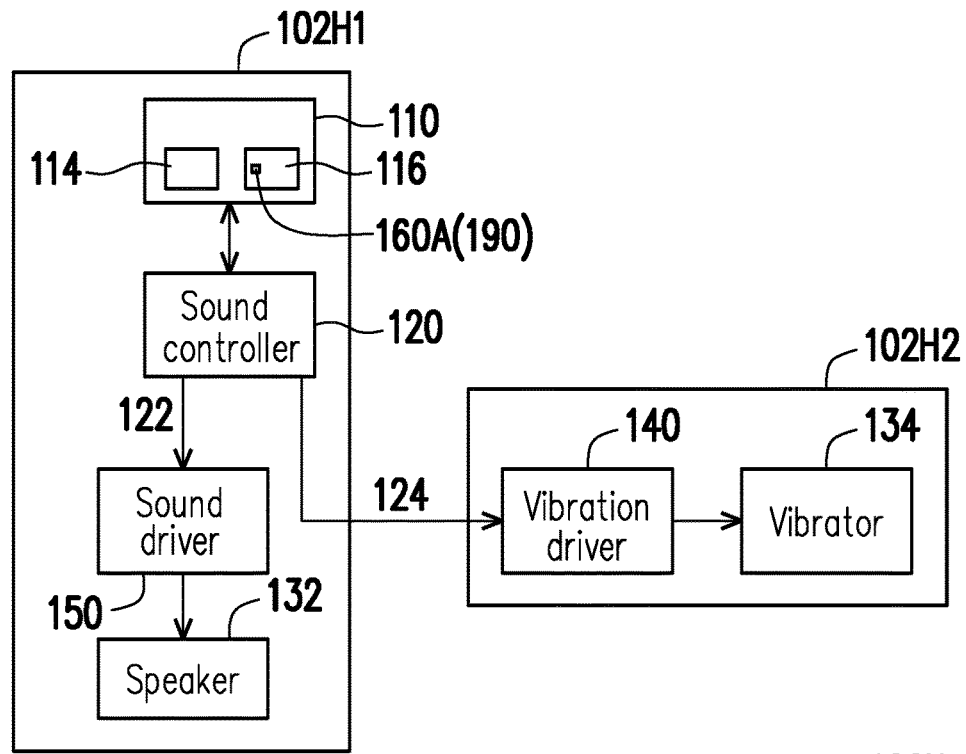
FIG. 6 is a schematic block diagram of a head mounted display according to another embodiment of the application.

FIG. 6 is a schematic block diagram of a head mounted display 100H according to another embodiment of the application. Referring to FIG. 6, the main difference between the head mounted display 100H and the head mounted display 100D illustrated in FIG. 2 is as below. The head mounted display 100H further includes a sound driver 150, a first housing 102H1 and a second housing 102H2, wherein the main body 110, the sound controller 120, the sound driver 150 and the speaker 132 are assembled to the first housing 102H1. The vibration driver 140 and the vibrator 134 are assembled to the second housing 102H2. The speaker 132 is electrically connected to the sound controller 120 via the sound driver 150. The first housing 102H1 is separated from the second housing 102H2.

The vibration generated by the vibrator 134 may cause the display device 114 to vibrate. In order to reduce the vibration of the display device 114 caused by the vibration generated by the vibrator 134, a cushion pad may be disposed or a strap (e.g., the strap 112 illustrated in FIG. 1C) may be used on the vibrator 134 of each of the head mounted displays 100A to 100B to mitigate the influence on the display device 114 caused by the vibration. Furthermore, the generation of the vibration signal 124 or the disposition of the vibrator 134 may be adjusted according to structural configuration of the head mounted displays 100A to 100C. For example, in FIG. 1A to FIG. 1C, the vibration of the head mounted display 100A to 100C along the Y axis and the Z axis may be much suppressed, but it is difficult to suppress the vibration along the X axis (because the fixation along the X axis is relatively weak). Thus, the placement of the vibrator 134 has to be prevented in the main vibration direction along the X axis. Alternatively, two vibrators 134 at the left and the right may be used, and a pattern phase difference of the vibration signals 124 of the two vibrators at the left and the right may be set to 180 degrees, thereby mitigating the vibration effect along the X axis.

Moreover, besides the vibration of the display device 114 that causes unpleasant experience to the user, some types of the vibrations may also cause unpleasant experience to the user, such as a high-frequency vibration, a regular continuous vibration and a continuous strong vibration.

Figure 7:
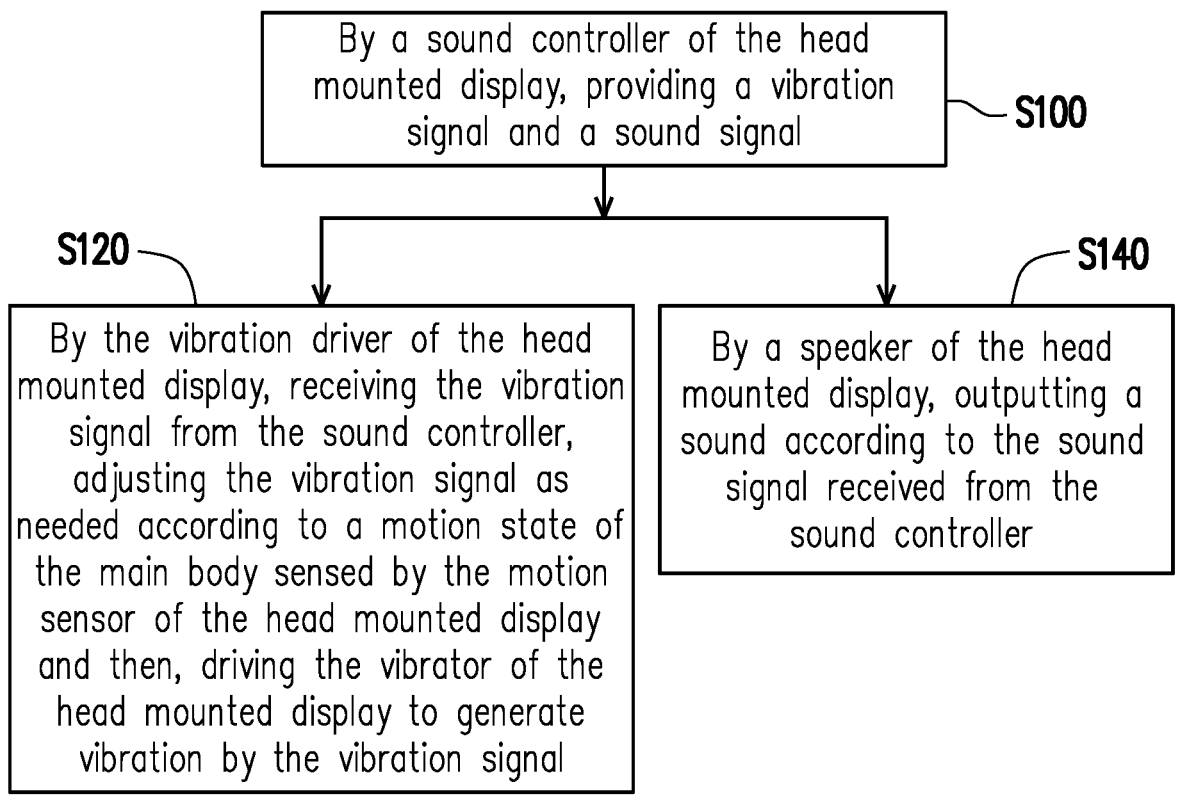
FIG. 7 is a flowchart of a driving method of a head mounted display according to an embodiment of the application.

FIG. 7 is a flowchart of a driving method of a head mounted display 100D according to an embodiment of the application. Referring to FIG. 7, the driving method of the head mounted display of the present embodiment includes steps as follows. A sound controller 120 of the head mounted display 100D provides a vibration signal 124 and a sound signal 122, in step S100. A vibration driver 140 of the head mounted display 100D receives the vibration signal 124 from the sound controller 120 by, adjusts the vibration signal 124 as needed according to a motion state of the main body 110 sensed by the motion sensor 190 of the head mounted display 100D and then, drives the vibrator 134 of the head mounted display 100D by the vibration signal 124 to generate vibration, in step S120. A speaker 132 of the head mounted display 100D outputs a sound according to the sound signal 122 received from the sound controller 120, in step S140. In the driving method of the head mounted display 100D of the present embodiment, the user is provided with not only the sound by the speaker, but also the vibration correspondingly generated by the vibrator 134, such that the user may have good experience.

Furthermore, responses of human mechanoreceptors (i.e., receptors that the human body perceives mechanical stimulations, such as pressure, deformation and so on) to the vibration is not linear with respect to the frequency. In general, the human body is more sensitive to high-frequency vibrations. The high-frequency vibrations are, for example, vibrations exceeding 100 Hz. Moreover, the head mounted display 100D may have a resonant frequency, and when a frequency of the vibration generated by the vibrator 134 is a resonant frequency, and a vibration amplitude of the vibration may be expanded, which causes unpleasant experience to the user and may likely cause the vibrator 134 to be damaged early. Thus, in order to mitigate the unpleasant experience of the user caused by the high-frequency vibrations and avoid the resonant frequency, the head mounted display 100D of the present embodiment may adjust a strength of the vibration signal according to a threshold.

Figure 8:
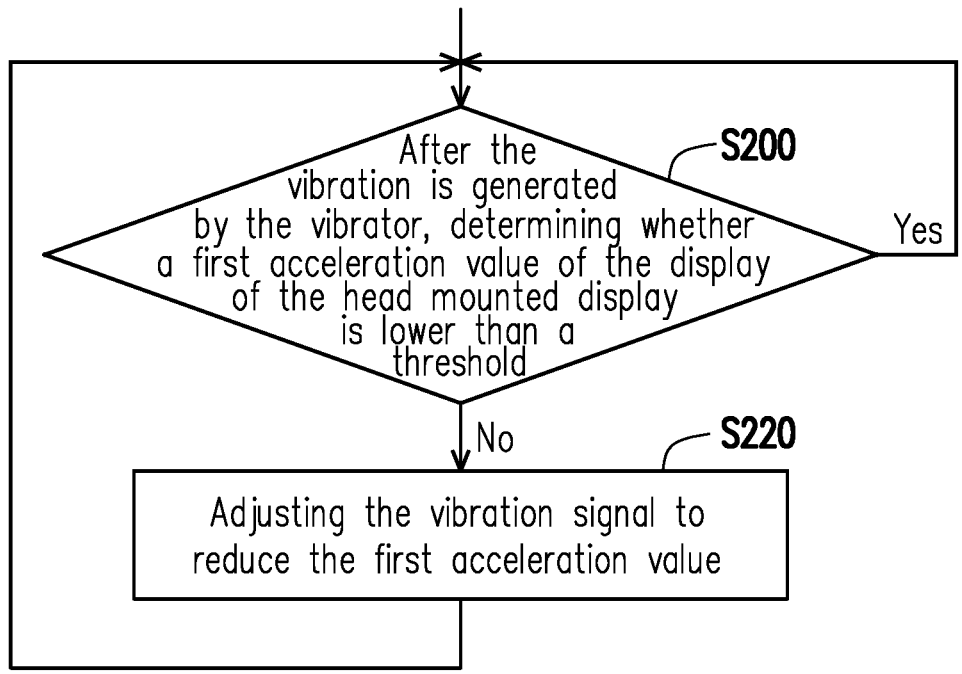
FIG. 8 is a flowchart of adjusting the vibration signal to reduce a first acceleration value in the driving method of the head mounted display according to an embodiment of the application.
Figure 9:
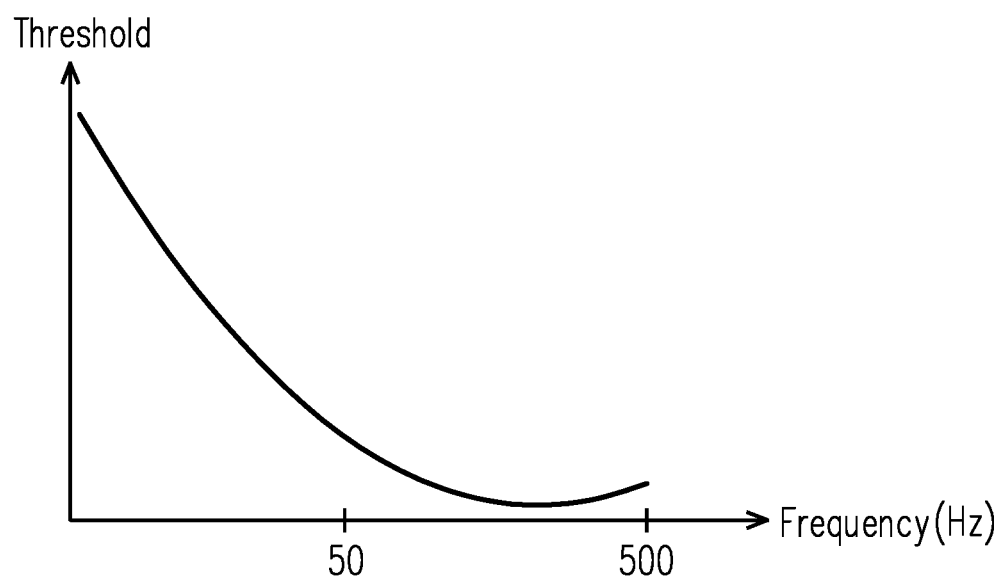
FIG. 9 is a relation graph of the threshold of the vibration perceived by a human body mechanoreceptor with respect to a frequency.

FIG. 8 is a flowchart of adjusting the vibration signal 124 to reduce a first acceleration value in the driving method of the head mounted display 100D according to an embodiment of the application. FIG. 9 is a relation graph of the threshold of the vibration perceived by a human body mechanoreceptor with respect to a frequency. Referring to FIG. 8 and FIG. 9, in the present embodiment, the step of adjusting the vibration signal 124 as needed is as follows. After the vibrator 134 generates the vibration, whether a first acceleration value of a display device 114 of the head mounted display 100D is lower than a threshold is determined, in step S200. If no, the vibration signal 124 is adjusted to reduce the first acceleration value, in step S220.

Referring to FIG. 2 again, the motion sensor 190 of the present embodiment may be a three-axial, six-axial or nine-axial sensor, which may be simplified as a sensor 160A for measuring an acceleration in the present embodiment and used to measure an acceleration value of the main body 110. The head mounted display 100D may obtain the vibration strength corresponding to a location of the display device 114 indirectly through the acceleration value or by means of measurement for the head mounted display 100D to adjust the vibration signal 124 as needed. The first acceleration value of the display device 114 is, for example, from the motion sensor disposed on a circuit board 116 of a main body 110 of the head mounted display 100D. The motion sensor is disposed on the circuit board 116 and may be separated from the display device 114.

Figure 10:
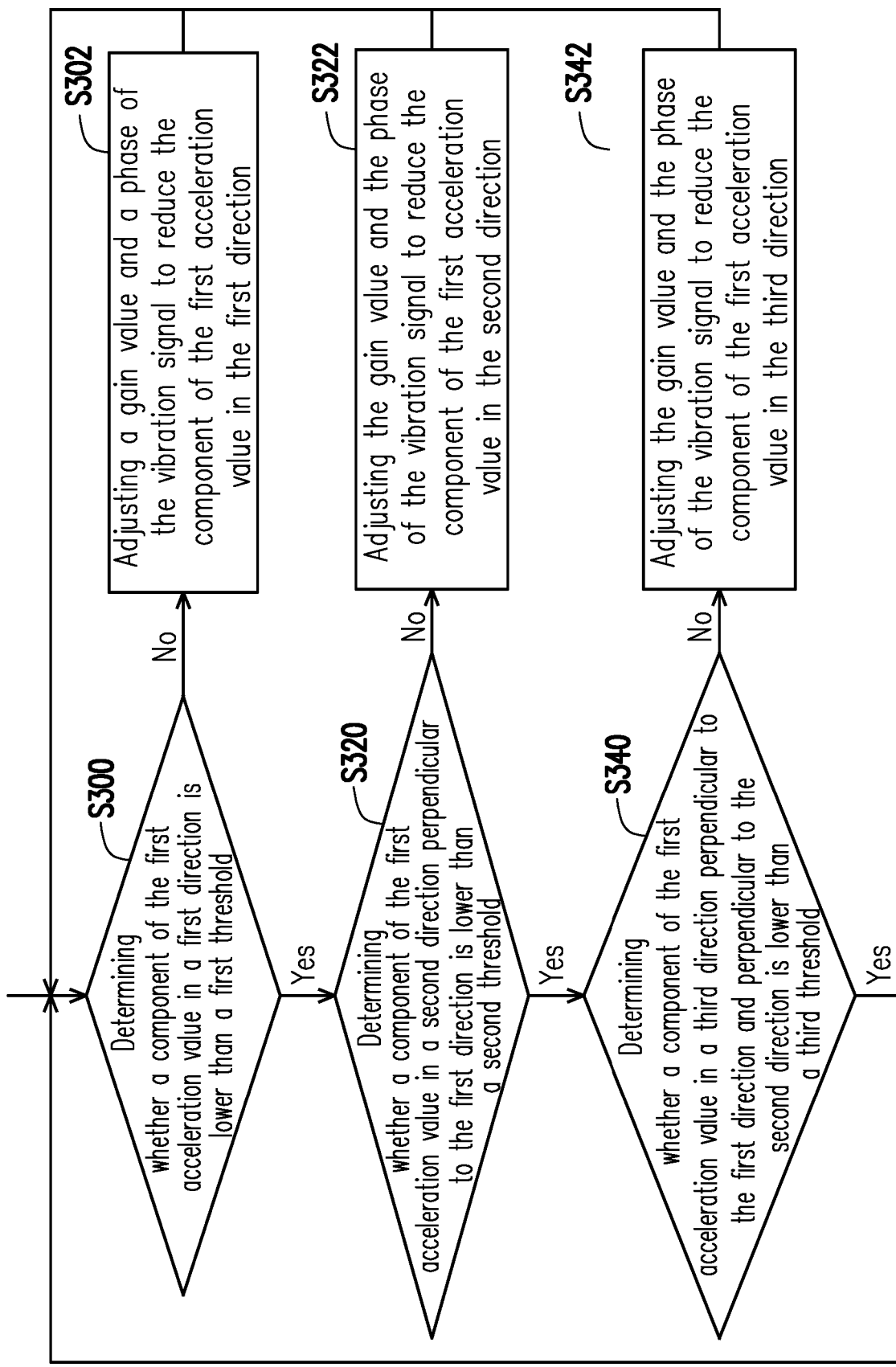
FIG. 10 is a flowchart of determining the first acceleration value to adjust the vibration signal in the driving method of the head mounted display according to an embodiment of the application.

FIG. 10 is a flowchart of determining the first acceleration value to adjust the vibration signal 124 in the driving method of the head mounted display 100D according to an embodiment of the application. Referring to FIG. 10, in the present embodiment, the method of determining the first acceleration value and adjusting the vibration signal 124 includes steps as follows. Whether a component of the first acceleration value in a first direction is lower than a first threshold is determined, in step S300. If no, a gain value and a phase of the vibration signal 124 are adjusted to reduce the component of the first acceleration value in the first direction, in step S302. Whether a component of the first acceleration value in a second direction perpendicular to the first direction is lower than a second threshold is determined, in step S320. If no, the gain value and the phase of the vibration signal 124 are adjusted to reduce the component of the first acceleration value in the second direction, in step S322. Whether a component of the first acceleration value in a third direction perpendicular to the first direction and perpendicular to the second direction is lower than a third threshold is determined, in step S340. If no, the gain value and the phase of the vibration signal 124 are adjusted to reduce the component of the first acceleration value in the third direction, in step S342. Referring to again to FIG. 1A to FIG. 1C, each of the aforementioned first to the third directions is, for example, one of the X-, Y- and Z-axial directions.

Generally, the three-axial, six-axial or nine-axial sensor of the head mounted display 100D is disposed on the circuit board 116 of the main body 110, instead of being disposed on the display device 114. In other words, the acceleration value, for example, directly measured by the sensor 160A usually may not directly reflect the acceleration value of the display device 114. Thus, it is necessary to establish a transfer function to transfer the acceleration value directly measured by the sensor 160A into the acceleration value reflected on the display device 114. The transfer function may be a set of comparison tables, an artificial intelligence (AI) model or a machine learning algorithm.

Figure 11:
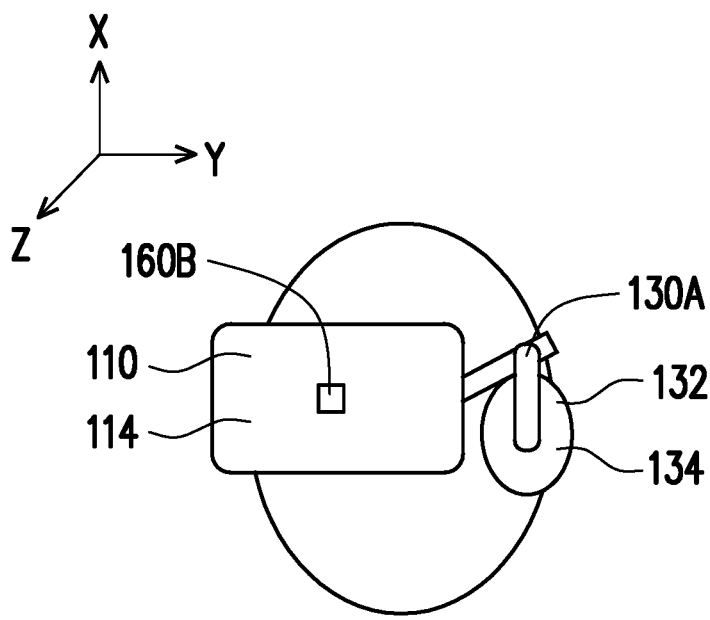
FIG. 11 is a schematic diagram of the head mounted display disposed with a sensor according to an embodiment of the application.
Figure 12:
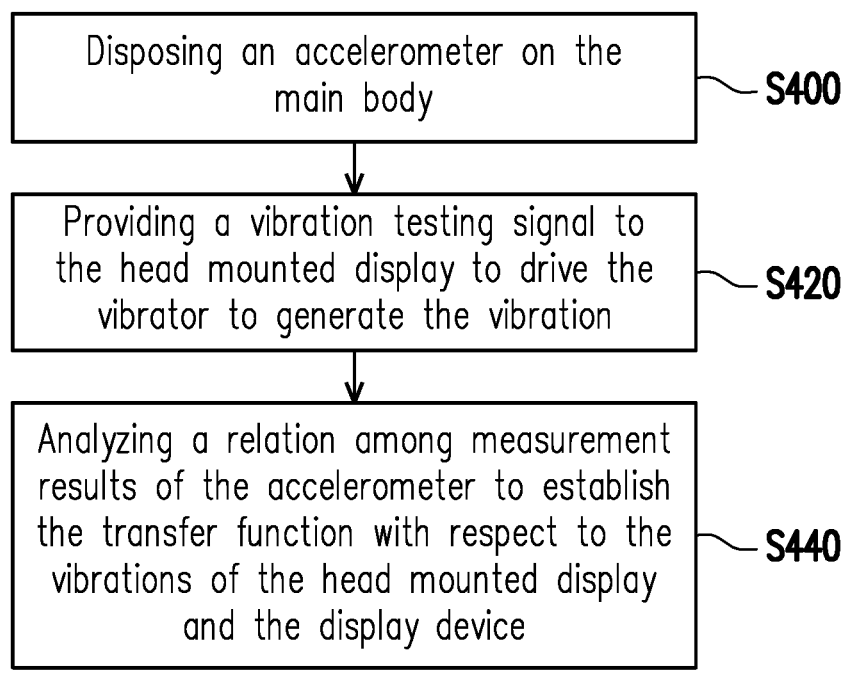
FIG. 12 is a flowchart of an establishing method of a transfer function for the driving method of the head mounted display according to an embodiment of the application.

FIG. 11 is a schematic diagram of the head mounted display 100D disposed with a sensor according to an embodiment of the application. The sensor may be disposed at different locations on the head mounted display 100D according to demands. The motion sensor may sense not only motion or rotation of the user, but also the vibration caused by the vibrator 134 or the speaker 132 of the head mounted display 100D. The head mounted display 100D may also be disposed with a plurality of sensors. FIG. 11 is a schematic diagram that the sensor of the present embodiment is simplified as an accelerometer, but the application is not limited thereto. FIG. 12 is a flowchart of an establishing method of a transfer function for the driving method of the head mounted display 100D according to an embodiment of the application. Referring to FIG. 11 and FIG. 12, in the present embodiment, the establishing method of the transfer function is as follows. An accelerometer 160B is disposed on the main body 110. The accelerometer 160B is, for example, disposed in the center of the main body 110. The accelerometer 160B may be disposed at a non-central location of the main body 110 or a location away from the axis. The location of the accelerometer 160B corresponds to different locations on the main body 110 and the display device 114. In step S400, a vibration testing signal is provided to the head mounted display 100D to induce the vibrator 134 to generate vibration. The vibration testing signal may be a pulse signal, a multi-frequency signal or a broadband signal, in step S420. A relation among measurement results of the accelerometer 160B is analyzed to establish the transfer function with respect to vibrations of the head mounted display 100D and the display device 114, in step S440. The establishment of the transfer function may be completed during the design stage of the head mounted display 100D. Namely, the accelerometer 160B is only disposed on the head mounted display 100D under test for the purpose of establishing the transfer function. The measurement result of the motion sensor 190 is transferred into an actual acceleration of a location of the display device 114 through the transfer function.

Figure 13:
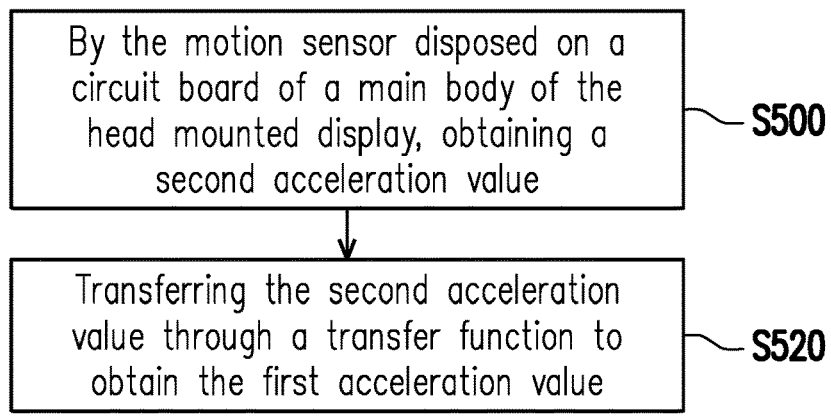
FIG. 13 is a flowchart of obtaining the first acceleration value through the transfer function by the sensor of the head mounted display according to an embodiment of the application.

FIG. 13 is a flowchart of obtaining the first acceleration value through the transfer function by the sensor 160A of the head mounted display 100D according to an embodiment of the application. Referring to FIG. 13, in the present embodiment, the method of determining whether the first acceleration value is lower than the threshold is as follows. A second acceleration value is obtained by the motion sensor 190 disposed on a circuit board 116 of a main body 110 of the head mounted display 100D, i.e., the acceleration value is directly measured by the sensor 160A, in step S500. The second acceleration value is transferred through the transfer function to obtain the first acceleration value, i.e., the acceleration value reflected on the display device 114, in step S520.

Furthermore, a regular continuous vibration for a long time also causes unpleasant experience to the user. Whether it is a regular continuous vibration is determined by, for example, a digital signal processor in the vibration driver 140 checking a similarity of patterns of the vibration signals 124 that are continuously received.

Figure 14:
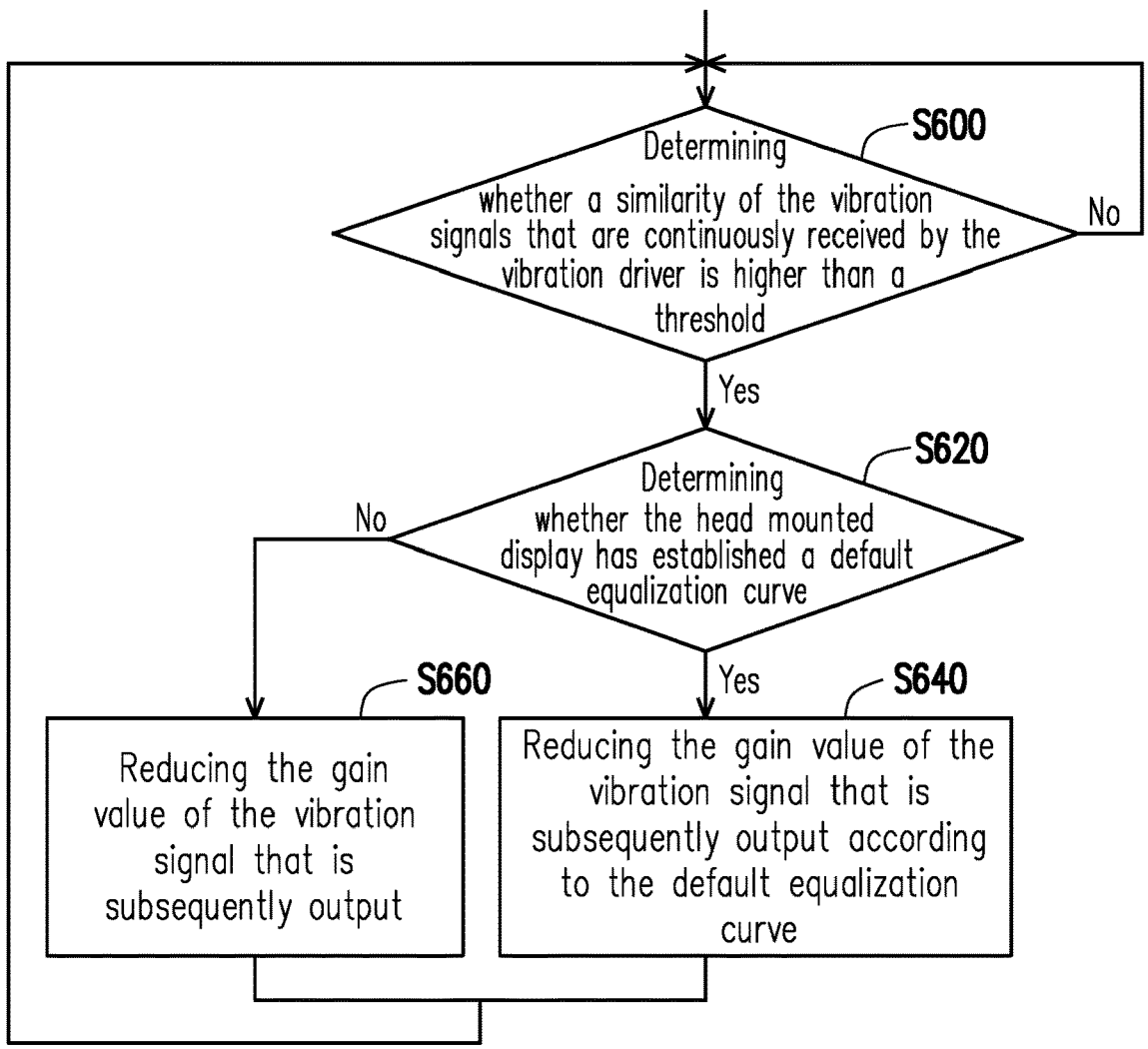
FIG. 14 is a flowchart of reducing the regular continuous vibration by the driving method of the head mounted display according to an embodiment of the application.
Figure 15:
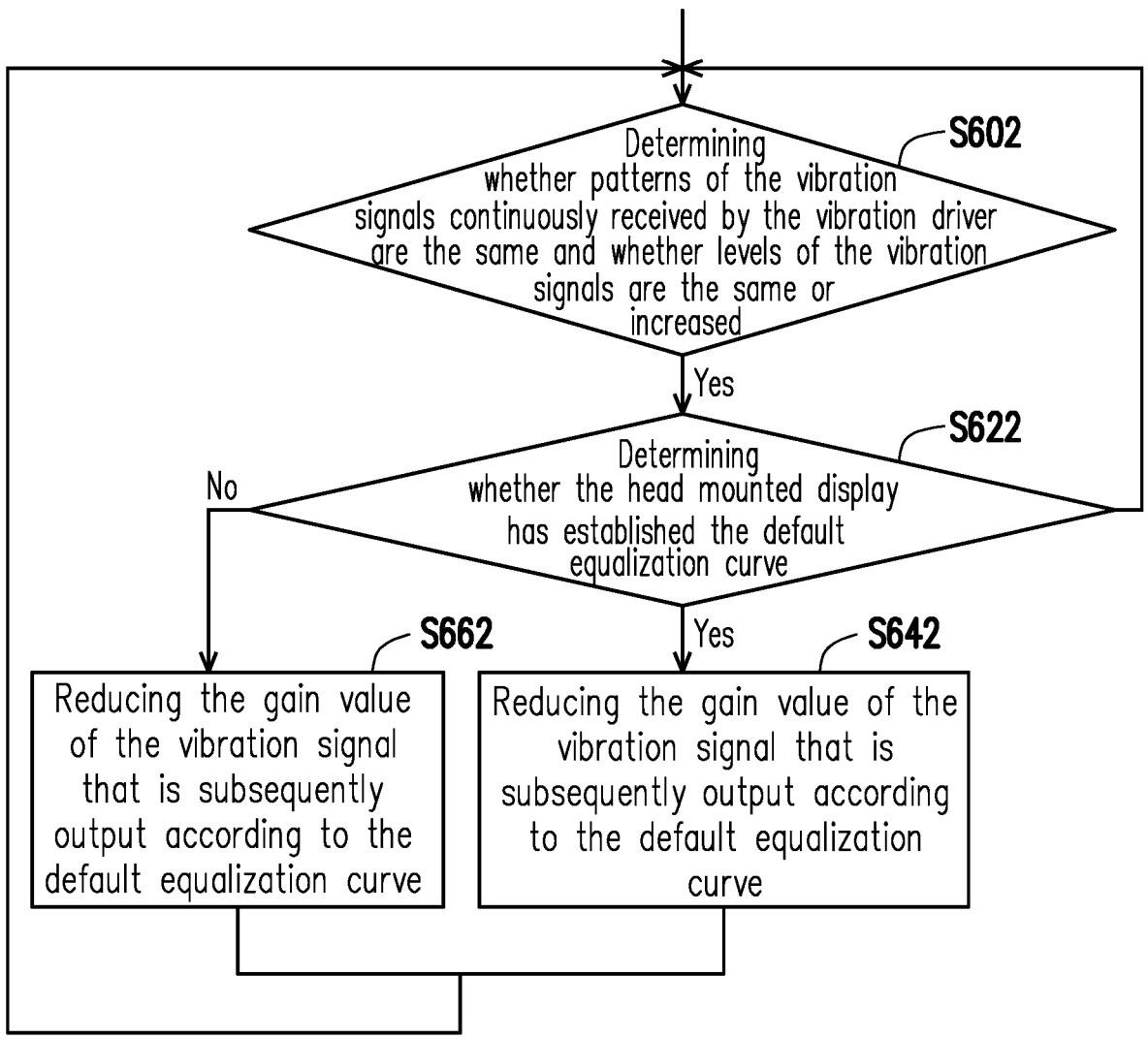
FIG. 15 is flowchart of reducing the gain value of the vibration signal that are subsequently received depicted in FIG. 14.

FIG. 14 is a flowchart of reducing the regular continuous vibration in the driving method of the head mounted display 100D according to an embodiment of the application. FIG. 15 is flowchart of reducing gain values of the vibration signals 124 that are subsequently received in FIG. 14. Referring to FIG. 14 and FIG. 15, in the present embodiment, the step of adjusting the vibration signal 124 as needed is as follows. Whether a similarity of the vibration signals 124 that are continuously received by the vibration driver 140 is higher than a threshold is determined, in step S600. If yes, the gain values of the vibration signal 124 that is subsequently output is reduced, in step S660.

In addition, step S600 includes steps as follows. Whether the patterns of the vibration signals 124 that are continuously received by the vibration driver 140 are the same and whether levels of the vibration signals 124 are the same or increased are determined, in step S602. If both are yes, the gain value of the vibration signal 124 that is subsequently output are reduced, in step S662.

Furthermore, a continuous strong vibration may also cause unpleasant experience to the user. The continuous strong vibration is determined by the vibration driver 140 checking whether a duration that an average level of the vibration signals 124 in a low-frequency band is greater than a threshold level lasts too long. The low-frequency band is, for example, less than or equal to 200 Hz.

Figure 16:
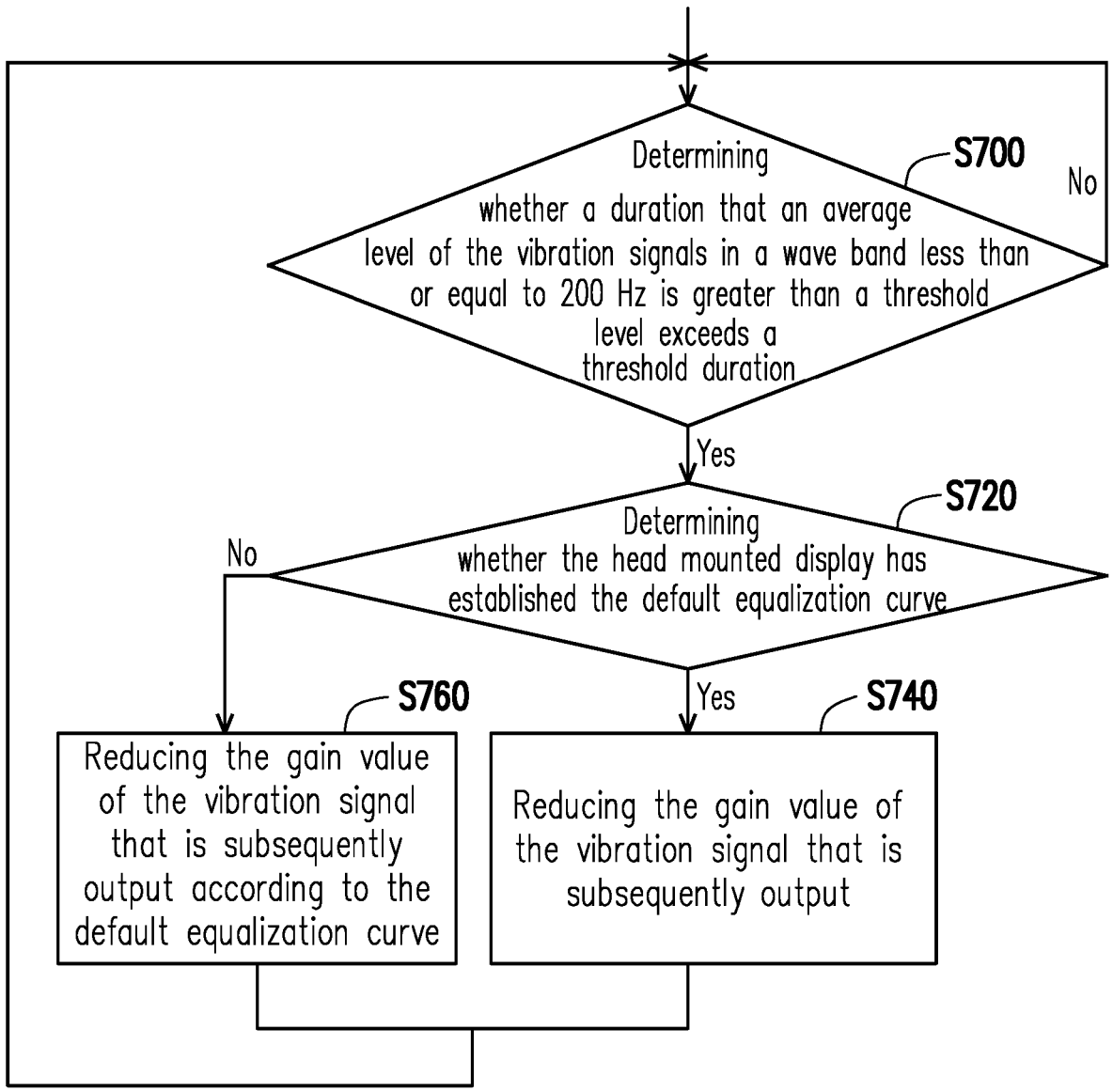
FIG. 16 is a flowchart of reducing the continuous strong vibration in the driving method of the head mounted display according to an embodiment of the application.

FIG. 16 is a flowchart of reducing the continuous strong vibration in the driving method of the head mounted display 100D according to an embodiment of the application. Referring to FIG. 16, in the present embodiment, the step of adjusting the vibration signal 124 as needed is as follows. Whether a duration that an average level of the vibration signal 124 in a wave band less than or equal to 200 Hz is greater than a threshold level exceeds a threshold duration is determined, in step S700. If yes, the gain value of the vibration signal 124 that is subsequently output is reduced, in step S760.

In addition, the head mounted display 100D of an embodiment of the application may select to use a default equalization curve to adjust the vibration signal 124 as needed in step S120.

Figure 17:
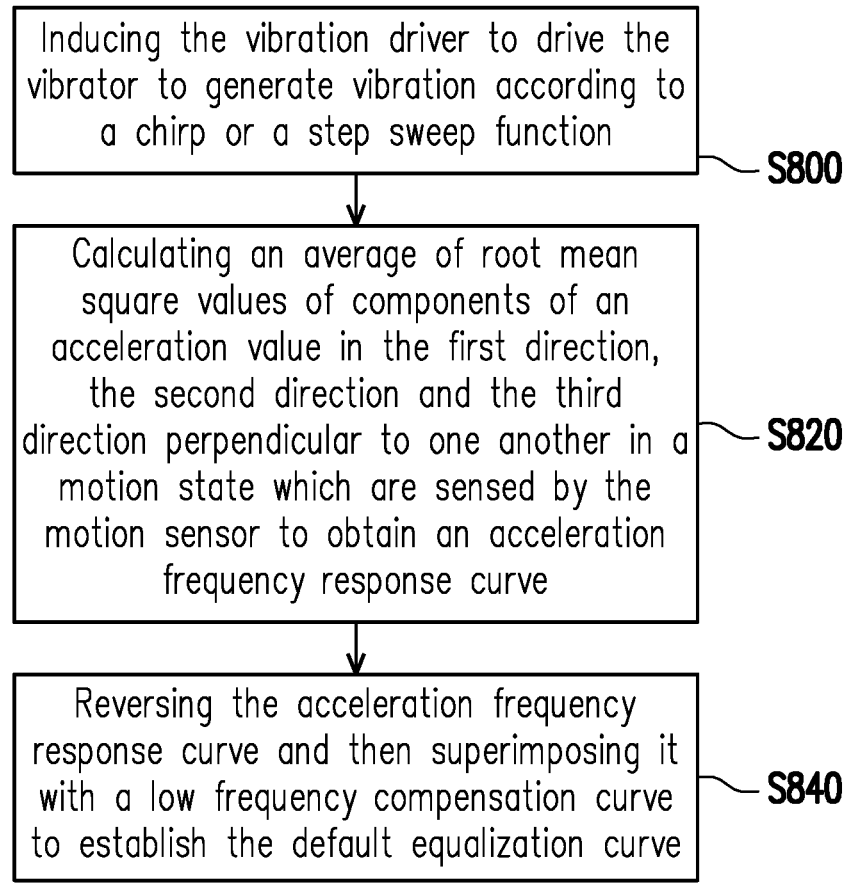
FIG. 17 is a flowchart of a method of establishing a default equalization curve for the driving method of the head mounted display according to an embodiment of the application.
Figure 18:
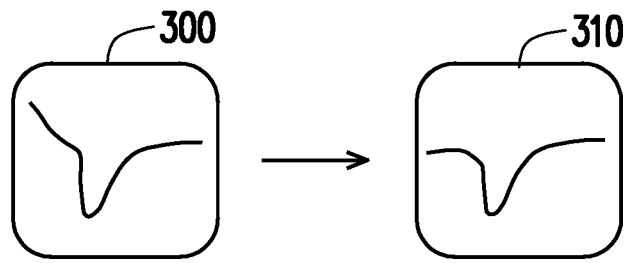
FIG. 18 is a schematic diagram of a vibration signal obtained by adjusting a gain value according to a default equalization curve.

FIG. 17 is a flowchart of a method of establishing a default equalization curve for the driving method of the head mounted display 100D according to an embodiment of the application. FIG. 18 is a schematic diagram of a vibration signal 310 obtained by adjusting a gain value according to a default equalization curve 300. Referring to FIG. 17 and FIG. 18, in the present embodiment, the step of adjusting the vibration signal 124 as needed uses a default equalization curve 300 to reduce the gain value of the vibration signal 124 that is subsequently output. The method of establishing the default equalization curve 300 includes steps as follows. The vibration driver 140 is induced to drive the vibrator 134 to generate vibration according to a chirp or a step sweep function, in step S800. An average of root mean square (RMS) values of components of an acceleration value in the first direction, the second direction and the third direction perpendicular to one another in a motion state which are sensed by the motion sensor 190 is calculated to obtain an acceleration frequency response curve, in step S820. The acceleration frequency response curve is reversed and then is superimposed with a low-frequency compensation curve to establish the default equalization curve 300, in step S840. The vibration signal after being adjusted is, for example, the vibration signal 310 illustrated in FIG. 18.

Referring again to FIG. 7 and FIG. 14 to FIG. 17, based on the establishment of the default equalization curve, step S120 of the present embodiment illustrated in FIG. 7 may include: determining whether the head mounted display 100D has established the default equalization curve 300 (step S620, S622 or S720). If yes, the gain value of the vibration signal 124 that is subsequently output is reduced according to the default equalization curve 300, in step S640, S642 or S740.

Furthermore, in the head mounted display 100D of an embodiment of the application, the head mounted display 100D may further correspondingly adjust the vibration signal 124 according to the user's head circumference size to drive the vibrator 140 to generate the vibration.

Figure 19:
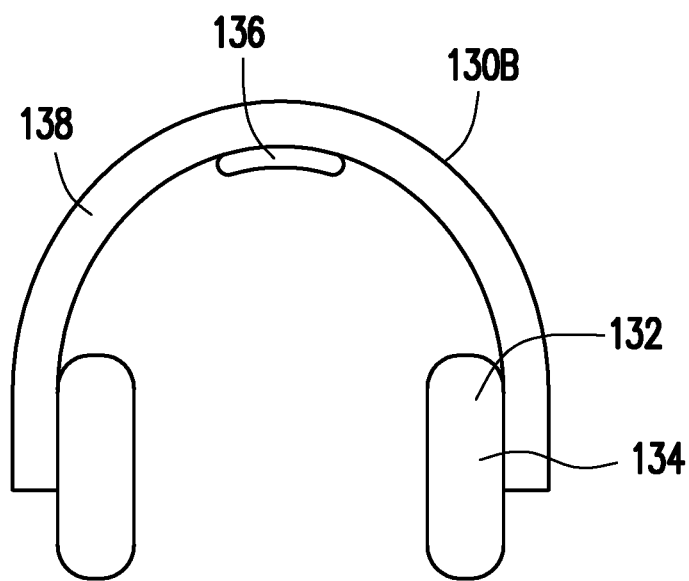
FIG. 19 is a schematic diagram of the head mounted display disposed with a strain gauge according to an embodiment of the application.
Figure 20:
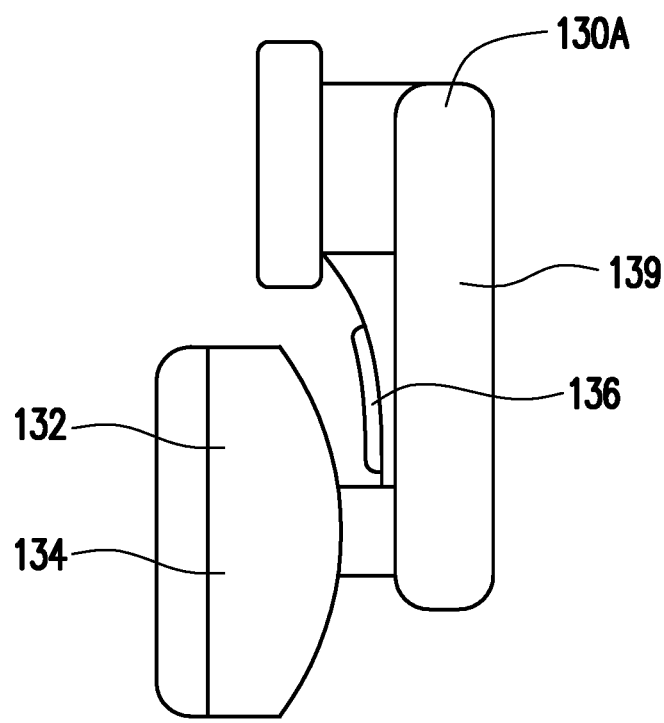
FIG. 20 is another schematic diagram of the head mounted display disposed with the strain gauge according to an embodiment of the application.

FIG. 19 is a schematic diagram of the head mounted display 100D disposed with a strain gauge 136 according to an embodiment of the application. FIG. 20 is another schematic diagram of the head mounted display disposed with the strain gauge 136 according to an embodiment of the application. Referring to FIG. 19 first, in the present embodiment, the head mounted display 100D further includes a strain gauge 136. The strain gauge 136 is electrically connected to the vibration driver 140 and configured to measure the head circumference size of the user of the head mounted display 100D. The vibration driver 140 adjusts the vibration signal 124 according to a measurement result of the strain gauge 136 to drive the vibrator 140 to generate the vibration.

In an embodiment, the step of adjusting the vibration signal 124 as needed uses one of a plurality of default equalization curves 300 to reduce the gain value of the vibration signal 124 that is subsequently output, and these default equalization curves 300 respectively correspond to different head circumference sizes. In other words, the strain gauge 136 of the head mounted display 100D measures the head circumference size of the user wearing the head mounted display 100D to determine which one of the default equalization curves 300 is used to reduce the gain value of the vibration signal 124 that is subsequently output.

Referring again to FIG. 19 and FIG. 20, in an embodiment, the strain gauge 136 may be, for example, disposed on a strap 138 of the headphone 130B illustrated in FIG. 19. In another embodiment, as illustrated in FIG. 20, the strain gauge 136 may be disposed on a side structure 139 of the headphone 130A.

Figure 21:
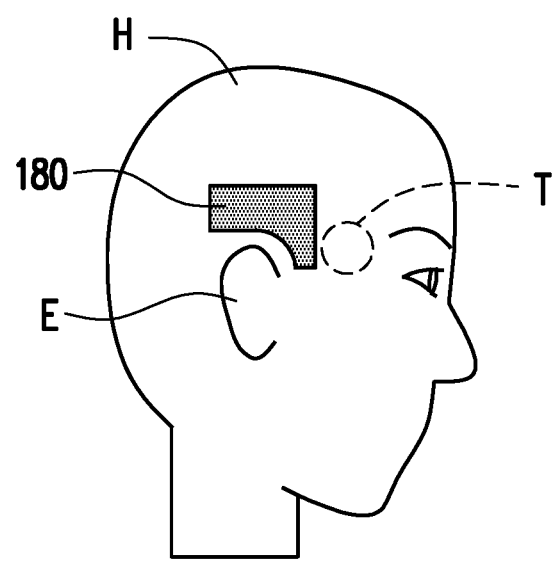
FIG. 21 is a schematic diagram of the head mounted display disposed with a cushion pad according to an embodiment of the application.

FIG. 21 is a schematic diagram of the head mounted display disposed with a cushion pad according to an embodiment of the application. Referring to FIG. 21, in an embodiment, the head mounted display 100D further includes a cushion pad 180, wherein a location where a vibrator (not shown) is disposed corresponds to a location above an ear on the user's head H of the head mounted display 100D, and the cushion pad 180 is disposed between the user's head H and the vibrator (not shown).

Specifically, the vibrator is disposed on the temple T between the ear E and the eye, or the vibrator is disposed at a portion of the ear E near the neck, which causes unpleasant experience to the user. Thus, a preferable location for the vibrator may be located above the ear E on the user's head H. Furthermore, in order to prevent the vibration generated by the vibrator from generating a sound in a bone conduction manner which enters the ear E, the head mounted display 100D may use the cushion pad 180 disposed between the user's head H and the vibrator to absorb any undesired sound to prevent any distorted sound from being generated.

Based on the above, in the head mounted display and the driving method thereof provided by one of the embodiments of the application, the vibration driver is electrically connected to the sound controller, the vibrator is electrically connected to the vibration driver, and the vibration driver receives the vibration signal from the sound controller, adjusts the vibration signal as needed according to the motion state of the main body and then drives the vibrator to generate the vibration by the vibration signal. The vibration driver can allow the user to have not only audio-visual effects but also haptic feedbacks to obtain good experience. Additionally, in an embodiment, the head mounted display is disposed with the cushion pad or is used with the strap. In this way, the influence on the display device of the head mounted display from the vibration can be mitigated. Moreover, in an embodiment, the head mounted display device can adjust the vibration signal generation or the vibrator configuration according to the structural setting. In this way, the user can be provided with better experience.

In the driving method of the head mounted display of one of the embodiments, the user can have good experience through the adjustment of the vibration signal. Furthermore, in the driving method of one of the embodiments, the head mounted display can adjust the vibration signal strength according to the threshold. Thus, the high-frequency vibrations can be reduced by the driving method of the head mounted display to provide the user with better experience. Moreover, in the driving method of one of the embodiments, the head mounted display can establish the transfer function, such that the acceleration value of the display device can be in response to the acceleration value sensed by the motion sensor disposed on the main body. Thus, the driving method of the head mounted display can provide the user with better experience. Furthermore, in the driving method of one of the embodiments, the head mounted display can determine the pattern similarity between the vibration signals that continuously received by the vibration driver and then adjust the gain value of the subsequently output vibration signal. Thus, the regular continuous vibration can be reduced by the driving method of the head mounted display to provide the user with better experience. Moreover, in the driving method of one of the embodiments, the head mounted display can determine whether the duration that the average level of the vibration signal in the low-frequency band is greater than the threshold level lasts too long. Thereby, the continuous strong vibration can be reduced by the driving method of the head mounted display to provide the user with better experience. Furthermore, in the driving method of one of the embodiments, the head mounted display device can select to use the default equalization curve to adjust the vibration signal output to the vibrator, and the default equalization curve further corresponds to the user's head circumference size. Thus, the driving method of the head mounted display can provide the user with better experience.

In addition, in the driving method of the head mounted display of one of the embodiments, the location where the vibrator of the head mounted display is disposed corresponds to the location above the ear of the head of the user of the head mounted display, and the cushion pad is disposed between the user's head and the vibrator. Thus, the head mounted display and the driving method thereof can provide the user with better experience and can absorb any undesired sound to prevent any distorted sound from being generated.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A driving method of a head mounted display, comprising:
by a sound controller of the head mounted display, providing a vibration signal and a sound signal;
by a vibration driver of the head mounted display, receiving the vibration signal from the sound controller, adjusting at least an amplitude of the vibration signal according to a motion state of the main body sensed by a motion sensor of the head mounted display and then driving the vibrator to generate vibration by the vibration signal; and
by a speaker of the head mounted display, outputting a sound according to the sound signal received from the sound controller,
wherein the step of adjusting the vibration signal as needed comprises:
after the vibration is generated by the vibrator, determining whether a first acceleration value of a display device of the head mounted display is lower than a threshold, and if no, adjusting the vibration signal to reduce the first acceleration value,
wherein the step of determining the first acceleration value and adjusting the vibration signals comprises:
determining whether a component of the first acceleration value in a first direction is lower than a first threshold, and if no, adjusting a gain value and a phase of the vibration signal to reduce the component of the first acceleration value in the first direction;
determining whether a component of the first acceleration value in a second direction perpendicular to the first direction is lower than a second threshold, and if no, adjusting the gain value and the phase of the vibration signal to reduce the component of the first acceleration value in the second direction; and
determining whether a component of the first acceleration value in a third direction perpendicular to the first direction and perpendicular to the second direction is lower than a third threshold, and if no, adjusting the gain value and the phase of the vibration signal to reduce the component of the first acceleration value in the third direction.

2. A driving method of a head mounted display, comprising:
by a sound controller of the head mounted display, providing a vibration signal and a sound signal;
by a vibration driver of the head mounted display, receiving the vibration signal from the sound controller, adjusting at least an amplitude of the vibration signal according to a motion state of the main body sensed by a motion sensor of the head mounted display and then driving the vibrator to generate vibration by the vibration signal; and
by a speaker of the head mounted display, outputting a sound according to the sound signal received from the sound controller,
wherein the step of adjusting the vibration signal as needed comprises:
after the vibration is generated by the vibrator, determining whether a first acceleration value of a display device of the head mounted display is lower than a threshold, and if no, adjusting the vibration signal to reduce the first acceleration value,
wherein the step of determining whether the first acceleration value is lower than the threshold comprises:
by the motion sensor disposed on a circuit board of a main body of the head mounted display, obtaining a second acceleration value; and
transferring the second acceleration value through a transfer function to obtain the first acceleration value.

3. The driving method of the head mounted display according to claim 2, wherein a method of establishing the transfer function comprises:
disposing an accelerometer on the main body;
providing a vibration testing signal to the head mounted display to drive the vibrator to generate the vibration; and
analyzing a relation among measurement results of the accelerometer to establish the transfer function with respect to vibrations of the head mounted display and the display device.

4. The driving method of the head mounted display according to claim 1, wherein the step of adjusting the vibration signal as needed comprises:
determining whether a similarity of the vibration signals that are continuously received by the vibration driver is higher than a threshold, and if yes, reducing a gain value of the vibration signal that is subsequently output.

5. The driving method of the head mounted display according to claim 4, wherein the step of reducing the gain value of the vibration signal that is subsequently output comprises:
determining whether patterns of the vibration signals that are continuously received by the vibration driver are the same and levels of the vibration signals are the same or increased; and
if the continuously received patterns of the vibration signals are the same and the levels of the vibration signals are the same or increased, reducing the gain value of the vibration signal that is subsequently output.

6. The driving method of the head mounted display according to claim 1, wherein the step of adjusting the vibration signal as needed comprises:
determining whether an average level of the vibration signals in a wave band less than or equal to 200 Hz is greater than a threshold level for a duration exceeding a threshold duration, and if yes, reducing a gain value of the vibration signal that is subsequently output.

7. A driving method of a head mounted display, comprising:
by a sound controller of the head mounted display, providing a vibration signal and a sound signal;
by a vibration driver of the head mounted display, receiving the vibration signal from the sound controller, adjusting at least an amplitude of the vibration signal according to a motion state of the main body sensed by a motion sensor of the head mounted display and then driving the vibrator to generate vibration by the vibration signal; and
by a speaker of the head mounted display, outputting a sound according to the sound signal received from the sound controller, wherein the step of adjusting the vibration signal as needed uses a default equalization curve to reduce a gain value of the vibration signal that is subsequently output, and a method of establishing the default equalization curve comprises:
inducing the vibration driver to drive the vibrator to generate the vibration according to a chirp or a step sweep function;
calculating an average of root mean square values of components of an acceleration value in the first direction, the second direction and the third direction perpendicular to one another in a motion state which are sensed by the motion sensor to obtain an acceleration frequency response curve; and
reversing the acceleration frequency response curve and then superimposing it with a low-frequency compensation curve to establish the default equalization curve.

8. The driving method of the head mounted display according to claim 7, wherein the step of adjusting the vibration signal as needed comprises:
determining whether the head mounted display has established the default equalization curve; and
if yes, reducing the gain value of the vibration signal that is subsequently output according to the default equalization curve.

9. The driving method of the head mounted display according to claim 1, wherein the step of adjusting the vibration signal uses one of a plurality of default equalization curves to reduce a gain value of the vibration signal that is subsequently output, and the default equalization curves respectively correspond to a sensor response indicative of head circumference sizes.

10. The driving method of the head mounted display according to claim 9, further comprising using a sensor of the head mounted display to measure property of the head to determine which one of the default equalization curves is used to reduce the gain value of the vibration signal that is subsequently output.

11. The driving method of the head mounted display according to claim 2, wherein the step of adjusting the vibration signal as needed comprises:
determining whether a similarity of the vibration signals that are continuously received by the vibration driver is higher than a threshold, and if yes, reducing a gain value of the vibration signal that is subsequently output.

12. The driving method of the head mounted display according to claim 11, wherein the step of reducing the gain value of the vibration signal that is subsequently output comprises:
determining whether patterns of the vibration signals that are continuously received by the vibration driver are the same and levels of the vibration signals are the same or increased; and
if the continuously received patterns of the vibration signals are the same and the levels of the vibration signals are the same or increased, reducing the gain value of the vibration signal that is subsequently output.

13. The driving method of the head mounted display according to claim 2, wherein the step of adjusting the vibration signal as needed comprises:
determining whether an average level of the vibration signals in a wave band less than or equal to 200 Hz is greater than a threshold level for a duration exceeding a threshold duration, and if yes, reducing a gain value of the vibration signal that is subsequently output.

14. The driving method of the head mounted display according to claim 2, wherein the step of adjusting the vibration signal uses one of a plurality of default equalization curves to reduce a gain value of the vibration signal that is subsequently output, and the default equalization curves respectively correspond to a sensor response indicative of head circumference sizes.

15. The driving method of the head mounted display according to claim 14, further comprising using a sensor of the head mounted display to measure property of the head to determine which one of the default equalization curves is used to reduce the gain value of the vibration signal that is subsequently output.

16. The driving method of the head mounted display according to claim 7, wherein the step of adjusting the vibration signal as needed comprises:
determining whether a similarity of the vibration signals that are continuously received by the vibration driver is higher than a threshold, and if yes, reducing a gain value of the vibration signal that is subsequently output.

17. The driving method of the head mounted display according to claim 16, wherein the step of reducing the gain value of the vibration signal that is subsequently output comprises:
determining whether patterns of the vibration signals that are continuously received by the vibration driver are the same and levels of the vibration signals are the same or increased; and
if the continuously received patterns of the vibration signals are the same and the levels of the vibration signals are the same or increased, reducing the gain value of the vibration signal that is subsequently output.

18. The driving method of the head mounted display according to claim 7, wherein the step of adjusting the vibration signal as needed comprises:
determining whether an average level of the vibration signals in a wave band less than or equal to 200 Hz is greater than a threshold level for a duration exceeding a threshold duration, and if yes, reducing a gain value of the vibration signal that is subsequently output.

19. The driving method of the head mounted display according to claim 7, wherein the step of adjusting the vibration signal uses one of a plurality of default equalization curves to reduce a gain value of the vibration signal that is subsequently output, and the default equalization curves respectively correspond to a sensor response indicative of head circumference sizes.

20. The driving method of the head mounted display according to claim 19, further comprising using a sensor of the head mounted display to measure property of the head to determine which one of the default equalization curves is used to reduce the gain value of the vibration signal that is subsequently output.

* * * * *